Jan. 5, 1932.   C. T. BARTLETT   1,839,862
PACK BAG
Filed Dec. 3, 1928    2 Sheets-Sheet 1

INVENTOR.
Carleton T. Bartlett
BY M. C. Frank
ATTORNEY.

Jan. 5, 1932.   C. T. BARTLETT   1,839,862
PACK BAG
Filed Dec. 3, 1928   2 Sheets-Sheet 2
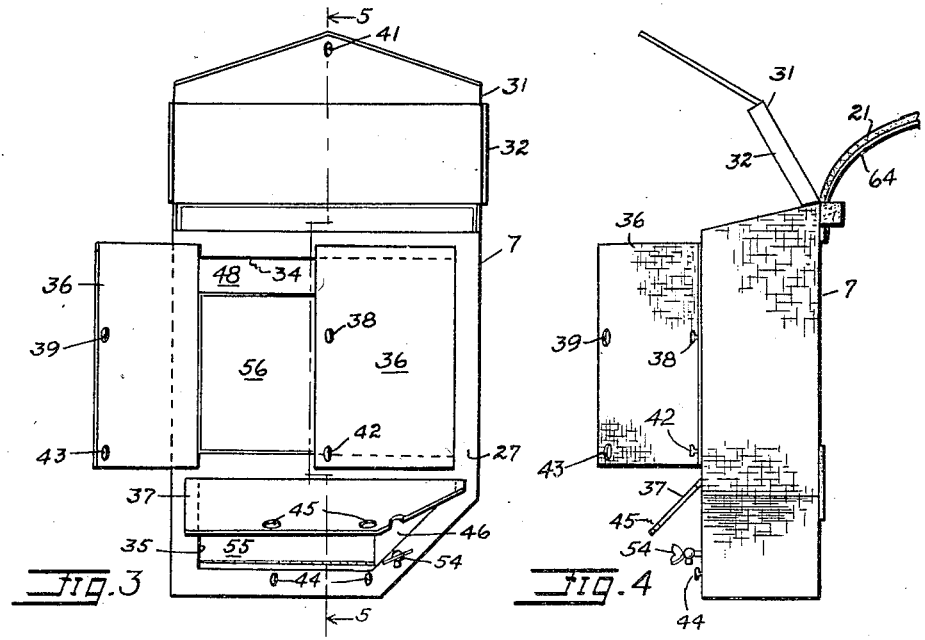
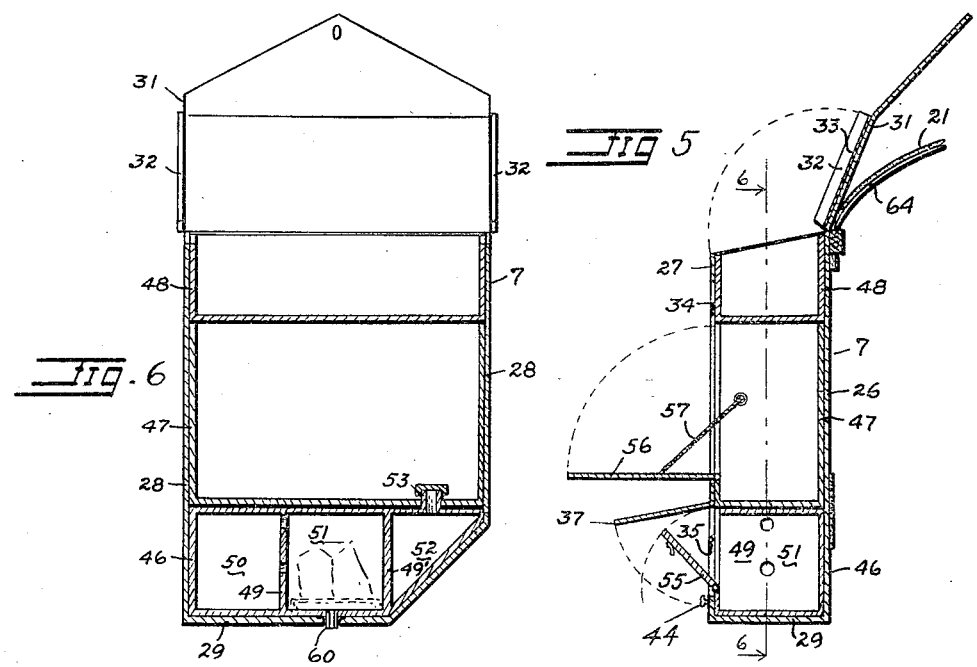
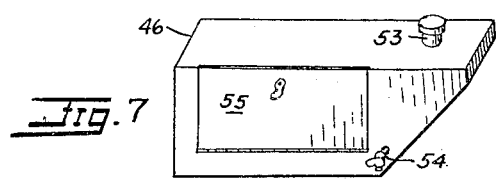
INVENTOR.
Carleton T. Bartlett
BY M. C. Frank
ATTORNEY.

Patented Jan. 5, 1932

1,839,862

UNITED STATES PATENT OFFICE

CARLETON T. BARTLETT, OF BERKELEY, CALIFORNIA

PACK BAG

Application filed December 3, 1928. Serial No. 323,232.

The invention relates to pack bags particularly designed for mounting at a forward portion of a motor vehicle.

An object of the invention is to provide a novel pack bag of the class described providing food compartments.

Another object of the invention is to provide a pack bag of the class described providing a refrigerating compartment which is accessible independently of the other compartments of the bag.

A further object of the invention is to provide for the mounting of a pair of the bags of the class described astride a hood covering the power plant of a vehicle and in a manner to fully support and hold the bags in mounted position without requiring the provision of special fastening means on the vehicle.

Yet another object of the invention is to provide means for effecting a fitted adjustment of the pair of bags to a vehicle whereby the pair of bags is arranged for mounting as a unit on vehicles of different makes.

The invention possesses other objects and features of advantage, some of which, with the foregoing, will be set forth in the following description of a preferred form of the invention which is illustrated in the accompanying drawings in which, Figure 1 is a perspective side view of a vehicle having an associated pair of the bags of my invention mounted thereon.

Figure 3 is an outer face view of a bag arranged to contain food, closure members of the bag being shown in open positions.

Figure 4 is a right-side view of the showing of Figure 3.

Figure 5 is a sectional view taken on the line 5—5 in Figure 3, certain parts of the structure being, however, differently disposed than in Figures 3 and 4.

Figure 6 is a sectional view taken on the line 6—6 in Figure 5; and Figure 7 is a perspective view of a refrigeration element for use with a bag.

Figure 1:
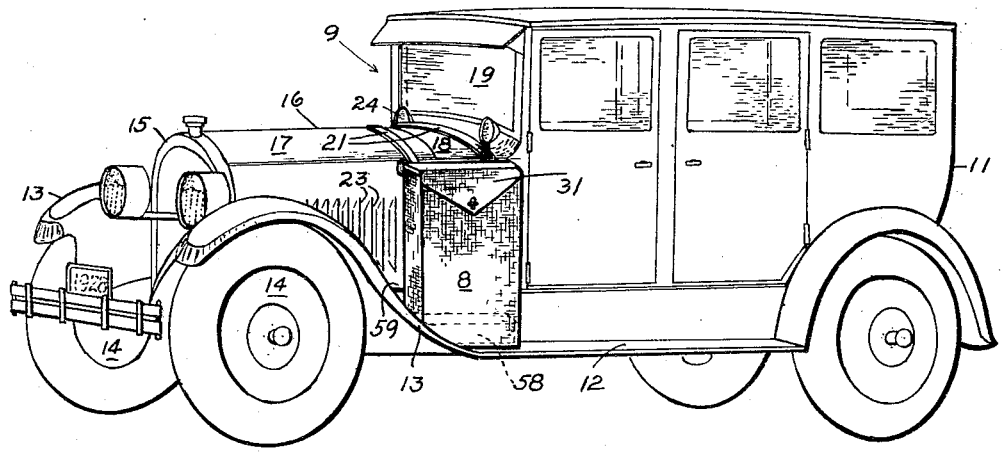

Essentially, and as shown, the elements of my invention are incorporated in and with bags 7 and 8 arranged for mounting on a motor vehicle 9. As is usual in present day motor vehicles, the vehicle 9 includes a body 11 and running-boards 12 at the sides of the vehicle extending laterally beyond the side lines of the body and also forwardly of the body, said running-boards being disposed somewhat below the bottom plane of the body. Fenders 13 extend upwardly and forwardly from the running-boards and over the front wheels 14. The vehicle is provided at the front with the usual radiator 15 carried by the frame which supports the body and running boards, and a hood 16 extends between the radiator and body for enclosing the vehicle power plant (not shown). The hood 16 is in the general form of an inverted U in section and is shown as comprising a removable front portion 17 supported on and between the radiator 15 and a fixed rear hood portion 18 which is cowl-like and extends forwardly from below the windshield 19.

The running-boards 12 and the cylindrical upper surface of the hood 16 are jointly utilized for supporting the bags 7 and 8 in mounted position. Accordingly, and as shown, the bottoms of the bags are supportedly engaged with the different running boards and the bags are connected at their tops by a pair of straps 21. The straps 21 extend from the backs of the bags and are of adjustable length whereby they may be tightened to tense them over the hood for holding the bag tops against the sides of the hood. While the running-boards provide the primary support for the bags, the tension of the straps 21 is preferably such that some degree of support is also provided by them, the attachment of the straps at the backs of the bags and at points thereof no higher than the tops of the side walls of the hood preventing any tendency to urge the bag bottoms outwardly on the running boards. As shown, the straps 21 are each formed in sections connected by means of suitable fastening members such as the buckles 22.

The bags 7 and 8 are made as wide as possible longitudinally of the vehicle, under which circumstances the bag bottoms may overlie portions of the front fenders 13 and must be cut away at their lower front corners to permit their support in upright position, such being the condition particularly shown. Preferably, the bags should extend over but few, if any, of the louvered ventilating openings 23 provided in the hood 16—as shown, the bags extend only to the rearmost opening. In this manner the bags do not interfere with the necessary rearward circulation of air through and from said openings. The engagement of the bag bottoms with the fenders 13 prevents a forward shifting of the bags at their bottoms, while the engagement of the rear strap 21 with the rise of the hood adjacent the body proper acts to prevent a rearward shifting of the bags at their tops. Generally, these means of preventing a front or rear shifting of the bags are sufficient, but if the hood top is provided with cowl lamps 24, one or both of the straps may be suitably secured thereto for positively holding the straps and bag tops in position. In the present instance, the rear strap 21 is seen to normally lie adjacent the lamp posts 25 and is accordingly split thereat to provide openings for receiving said posts; other projecting members on the hood top might of course be similarly utilized for anchoring one or both straps.

Each of the bags 7 and 8, it will now be noted, is of generally rectangular outline and is preferably formed of a pliable and self-supporting material such as heavy canvas, a number of plies of lighter canvas, or other suitable material, and said bags are of generally complementary outline for disposal at the opposite sides of the vehicle. Since a primary object of the provision of bags of the class described is to provide for the carrying of articles which would otherwise be carried within the vehicle body, and such articles frequently include food supplies, as for camping or picnics, at least one of the bags is preferably arranged to provide not only food carrying space but also means facilitating the serving of the food therefrom. As shown, the bag 7 is thus arranged, and said bag will now be described in detail.

Referring particularly to Figures 3 to 6 inclusive, it is seen that the bag 7 comprises a back wall 26 for disposal opposite the hood 16, a front wall 27, side walls 28, a bottom wall 29, and a top 31. The various walls are permanently fixed together along their coterminous edges and the top 31 is hingedly secured to the top edge of the back wall 26.

Flaps 32 are preferably provided at the sides of the top 31 for engagement along and outside the upper edge portions of the side walls 28, the hinge of the top is of a sealed type, and the free end of the top is arranged to lie over and against the top portion of the front wall, whereby, when the top 31 is operatively disposed, a rain and dust-proof closure is provided for the top of the bag. Preferably, and as shown, the top portion arranged to overlie the top bag opening is reinforced with a suitable stiffening member 33, said member also engaging the flaps 32 for holding them in transverse and operative relation to the top. The aforesaid top portion is preferably arranged to slope downwardly from the back of the bag whereby it may shed any rain or the like falling thereon.

Upper and lower openings 34 and 35 are provided in the front wall 27, said openings being of less width than said wall for a reason to be hereinafter brought out. Closure means are provided for the openings 34 and 35, and as shown, said means comprises a pair of outwardly swinging doors 36 hingedly mounted on the wall 27 at opposite sides of the opening 34 for cooperatively closing the same, and an outwardly swinging door 37 hingedly mounted at the top of the opening 35 for closing the latter. The rearward door 36 is arranged to be overlapped by the cooperating forward door 36 and carries a turn-button 38 for engagement in eyes 39 and 41 provided respectively in said forward door and the free end of the top 31. Further means may, if desired, be provided on the rearward door 36 for additionally securing the doors together and closing the opening 34. As shown, a second turn-button 42 and eye 43 are provided on the respective doors for this purpose. A suitable number of turn-buttons 44 are mounted on the front wall 27 below the opening 35 for engagement through eyes 45 provided in the free edge of the lower door 37. It will, of course, be obvious that other means than those shown and described might be used for securing the doors 36 and 37 in closure positions, without departing from the spirit of the invention, the essential requisites of the fastening means employed being their independence for the different doors 36 and 37. And it will be further noted that with the door 37 wider than and overlying the wall 27 at the sides of and below the opening 35, and the doors 36 extending below the bottom of the upper opening 34, the two openings are arranged to be protected against the entrance of rain therethrough when the doors are secured in operative position.

A plurality of containers is provided for superimposed disposal within the bag 7. As particularly disclosed, lower, intermediate, and upper containers 46, 47 and 48 respectively are provided for removable mounting in the bag. By reference to Figures 5 and 6, it is seen that the container 46 occupies the bag portion opposite the lower opening 35 and conforms in outline to the bag portion occupied by it. This container is arranged to provide a compartment for the reception of ice, and in the present instance, is divided by means of vertical partitions 49 and 49' formed of heat conducting material and defining compartments 50, 51 and 52 in the container 46. The intermediate compartment 51 is arranged to receive ice, the compartment 50 is arranged to receive food for the refrigeration thereof, and the compartment 52 is arranged to contain water for drinking purposes. Accordingly, the compartment 52 is closed and is provided at its top with a capped filler pipe 53 and at the bottom of its outer side with a faucet 54 for protrusion through and from the front bag wall 27. The partition 49, which separates the compartments 50 and 51, is preferably perforated to permit a circulation of air between said compartments. An upper front portion 55 of the front wall of the container 46 opposite the compartments 50 and 51 is hinged at its lower edge to swing outwardly through the opening 35 when the door 37 is opened, thereby providing for access to the said compartments. A drain pipe 60 extends from the ice compartment 51 through the bag bottom 29. The container 46 might well be constructed entirely of metal, though such is not essential.

The container 47 is arranged to be supported on the container 46, as has been previously indicated, and is, in the present embodiment, open at the top. An opening is provided in the front wall of the container 47 opposite a major portion of the bag wall opening 34. Hingedly fixed to the container 47 at the bottom of its front opening is a member 56, which member is arranged to provide a closure for said opening or to be swung to a protruding and horizontal position to provide a shelf for serving or the like, such position thereof being shown in Figure 5. A chain or cord 57 connects the member 56 with the end wall of the container for supporting the same in extended position for its use as a shelf, the exact device provided for this purpose being immaterial. Preferably, the member 56 is of a more or less permanent nature, being formed of such material as a wood veneer; the remainder of this container, on the other hand, may be of cardboard. The bottom of the container 47 is perforated to receive the filler pipe 53 therethrough whereby the water compartment 52 may be refilled without removal of the container 46.

The container 48 may also be formed of cardboard, is arranged to rest on the container 47, and fills the remainder of the bag space. This container is open only at the top, access thereto being provided by raising the bag cover or top 31, it now being noted that independent access to any or all of the containers 46, 47 and 48 is provided with the arrangement disclosed. The container 47 might be used for food which need not be refrigerated or for utensils. The upper container 48 provides storage space for any desired use. The various containers, and particularly the containers 47 and 48, are cheaply manufactured and may be frequently replaced without undue expense. It will now be noted that the before mentioned containers are arranged to be inserted in and removed from the bag 7 from the top thereof and that the retained front wall portions of the bag are arranged to retain the containers in place within the bag.

With respect to the bag 8, it is seen that this bag is of similar outline and structure to the bag 7, except that it lacks front wall openings. Preferably, and as shown, a member 58 is disposed at the bottom of the bag cavity for holding the bag bottom extended to its full size and shape. The member 58, which is shown in dotted lines in Figure 1, is of the same general outlines as the container 46, and may be open at the top for receiving a part of the contents of the bag, it being noted that the bag 8 is particularly intended for the reception of relatively soft articles such as clothing and bedding.

Referring now more generally to the bags 7 and 8, it will be seen that the covers or tops 31 of both bags, and the doors 36 and 37 of the bag 7 are preferably formed as integral parts of the wall structures, whereby the bag material itself provides the necessary hinges for these members, this feature further cheapening the production cost of the bags and insuring water-tight hinge joints, since the material of the bags is preferably waterproofed.

Figure 2:
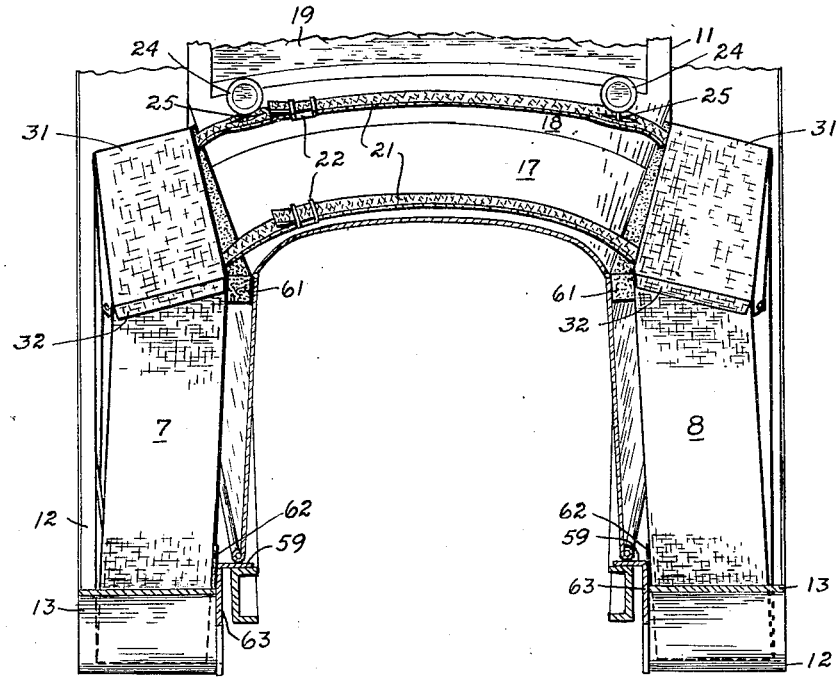
Figure 2 is an enlarged front perspective view showing the relation of the bags to the supporting and immediately adjacent vehicle parts, said vehicle parts being shown at and rearwardly of a section at the plane defined by the front sides of the bags.

Usually, and as shown in Figures 1 and 2, a step or shelf 59 is found at the bottom level of the automobile body and the hood, and between them and the running-board. Furthermore, the hood 16 tapers toward the front of the automobile, whereby a mounting of the bag in the manner described tends to effect a twisting distortion of each bag, as is shown in some degree in Figure 2. Furthermore, canvas or other hard woven material suitable for making the bags is abrasive to the enamelled surfaces of the automobile against which it might rub. Accordingly, and as shown, a pad 61 of felt or some other relatively non-abrasive material, is secured to each bag along the top of its back wall and rearwardly of the ends of the straps 21 for engagement against the hood. The pads 61 are preferably relatively thick whereby they cooperate with the steps 59 to space the bags from the hood. Preferably, and as shown, the pads 61 taper toward their rear ends whereby the aforesaid twisting of the bags may be minimized. This spacing of the bags from the hood also serves to provide passages behind the bags for the flow of heated air discharged from the hood openings 23 along the hood whereby such flow is not interfered with as would be the case if the bags closely engaged the hood. Anti-friction pads 62 are preferably provided adjacent the bottom of the bags for engagement with the risers 63 connecting the running board and the steps 59, thus protecting the enamel on said risers. The hood engaging sides of the straps are also preferably provided with a facing 64 of anti-friction material to protect the hood finish as is shown in Figures 4 and 5.

It will be clear that the pair of bags now described constitutes a unit for mounting at the front of a vehicle, may be adjustably fitted to their mounted position, are supported in part both, and solely, on the running board and hood, and requires the provision on the vehicle of no special means for securing them in place.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a pack bag for support on the running board of an automobile or the like, an outer container having a plurality of openings in an upright side thereof, and a plurality of inner containers formed of relatively rigid material and stacked in said outer container and respectively registering with the different said openings, one of said inner containers comprising a refrigeration unit and both of said inner containers provided with displaceable side closures respectively registering with said openings.

2. In a pack bag for support on the running board of an automobile or the like, an outer container having a plurality of openings in an upright side thereof, a plurality of inner containers formed of relatively rigid material and stacked in said outer container and respectively registering with the different said openings, one of said inner containers comprising a refrigeration unit, and displaceable side closures for said inner containers registering with said openings, one of said closures being arranged for horizontal extension through the said opening thereat to provide a shelf extending from the said outer container.

3. In a pack bag of the class described, an outer container formed of pliable material and having a plurality of side openings in an upright side thereof and a top opening, displaceable closures for said openings, a plurality of inner containers closely fitting within said bag in superimposed and stacked relation for fully distending the bag, certain of said inner containers having side openings for registration with the said side openings of the bag, and displaceable closure members for said side openings of the inner containers, one of said last closure members being arranged for horizontal extension through the corresponding bag opening, and means solely associated with said last closure member and its container for supporting the member in its horizontally extended position.

4. A food receptacle comprising a bag of pliable material having a plurality of openings in one side thereof, closures for said openings, containers of relatively rigid material fittedly disposed in said bag for independent access through said openings, one of said containers providing a food refrigerating compartment and the other container having a side thereof extendable from the bag through one of said openings to provide a shelf for the serving of food from said first container.

In testimony whereof I affix my signature.
CARLETON T. BARTLETT.